United States Patent [19]

Yamamoto et al.

[11] Patent Number: 4,604,254

[45] Date of Patent: Aug. 5, 1986

[54] BUTTERFLY VALVE

[75] Inventors: Masahiko Yamamoto, Nishinomiya; Yoshinori Nishino, Yamato-takada; Tadayoshi Uda, Izumi; Yoshiteru Sonoda, Habikino; Toshio Suyama, Osaka, all of Japan

[73] Assignee: Hitachi Zosen Corporation and Jujikin International, Inc., Osaka, Japan

[21] Appl. No.: 735,858

[22] Filed: May 20, 1985

[30] Foreign Application Priority Data

| May 23, 1984 | [JP] | Japan | 59-105156 |
| May 23, 1984 | [JP] | Japan | 59-76228[U] |
| May 23, 1984 | [JP] | Japan | 59-76229[U] |
| May 23, 1984 | [JP] | Japan | 59-76230[U] |
| May 23, 1984 | [JP] | Japan | 59-76231[U] |
| May 23, 1984 | [JP] | Japan | 59-76232[U] |
| May 23, 1984 | [JP] | Japan | 59-76233[U] |

[51] Int. Cl.⁴ ............... F16K 1/22; B28B 7/22
[52] U.S. Cl. .................... 264/254; 137/375; 251/306; 251/308; 264/242; 264/255; 264/328.8
[58] Field of Search ............ 137/375; 251/306, 308; 264/242, 254, 255, 328.8

[56] References Cited

U.S. PATENT DOCUMENTS

| 3,051,607 | 8/1962 | Werth | 264/242 |
| 3,206,530 | 9/1965 | Boteler | 137/375 |
| 3,399,863 | 9/1968 | Fawkes | 251/306 |
| 3,537,683 | 11/1970 | Snell, Jr. | 251/306 |
| 3,807,690 | 4/1974 | Pfundstein | 251/306 |
| 3,940,108 | 2/1976 | Edwards | 251/306 |
| 3,941,495 | 3/1976 | Duncan | 264/242 |
| 3,958,314 | 5/1976 | Kurkjian, Jr. | 251/306 |
| 3,958,595 | 5/1976 | Al et al. | 137/375 |
| 3,991,974 | 11/1976 | Bonafous | 251/306 |
| 4,225,112 | 9/1980 | Libke | 251/306 |
| 4,385,025 | 5/1983 | Salerno et al. | 264/255 |
| 4,515,347 | 5/1985 | Sitton et al. | 251/363 |

Primary Examiner—A. Michael Chambers
Assistant Examiner—Sheri M. Novack
Attorney, Agent, or Firm—Barnes, Kisselle, Raisch, Choate, Whittemore & Hulbert

[57] ABSTRACT

A butterfly valve comprises a substantially cylindrical casing (20) having an annular valve seat (A) on its inner peripheral surface, and a valve disk (44) disposed within the casing (20) and rotatable about an axis (35). The valve disk (44) is formed at an outer peripheral edge portion with an annular groove (52) in which an annular valve seat (51) is partially fitted. The valve seat (51) is adapted for pressing contact with the valve seat (A) at a predetermined pressure and anchored in the annular groove (52) by resin (58) pressure-injected into the annular groove (52) through a resin injection channel (53) in communication with the groove. Accordingly, the seal pressure of the valve seat (51) on the valve seat (A) can be set to the predetermined value at all times even if the dimensions of the valve seat (A) and the valve disk (44) and the position of the axis of rotation (35) involve errors.

14 Claims, 9 Drawing Figures

BUTTERFLY VALVE

The present invention relates to a butterfly valve for use in seawater pipelines (water purifying plants), water supply conduits, sewers, piping systems of chemical plants, etc.

The typical butterfly valve heretofore known comprises an approximately cylindrical casing having an annular valve seat on its inner peripheral surface, a valve stem rotatably extending through the casing, a valve disk attached to the valve stem by a stem mount portion and having an outer peripheral edge portion opposed in its entirety to the valve seat when the disk is in its closed position, and an annular valve seal fixedly attached to the outer peripheral edge portion so as to be in pressing contact with the valve seat when the valve disk is in its closed position. With this butterfly valve, the valve seat, the valve stem, the valve disk and the valve seal must be prepared with high precision, and the valve stem, the valve disk and the valve seal need to be installed in place also with high precision. Otherwise, it is impossible to assure a uniform pressure (seal pressure) of contact between the valve seat and the valve seal over the entire circumference when the valve disk is closed. Accordingly butterfly valves of this type which are satisfactory in performance are invariably expensive to make.

To overcome the above drawback, a butterfly valve has been proposed which includes clamp means at the outer peripheral edge portion of the valve disk for holding an annular valve seal. The valve seal is adjustably deformed by being compressed by the clamp means to realize the desired seal pressure despite the dimensional errors of the parts concerned and errors involved in installation. The butterfly valve nevertheless has the drawback that the valve seal breaks within a short period of time owing to fatigue deterioration because the seal is used as deformed by compression.

An object of the present invention is to provide a butterfly valve which is inexpensive to make and in which when the valve is closed, required uniform seal pressure can be obtained between the valve seat and the valve seal without entailing the problem of life.

In order fulfill the above object, the present invention provides a butterfly valve comprising a substantially cylindrical casing having an annular valve seat on its inner peripheral surface, valve stem means rotatably extending through the casing, a valve disk attached to the valve stem means by stem mount means and having an outer peripheral edge portion opposed in its entirety to the valve seat when the valve disk is in its closed position, and an annular valve seal attached to the outer peripheral edge portion of the valve disk so as be in pressing contact with the valve seat when the valve disk is in its closed position, the butterfly valve being characterized in that a) the valve disk is formed in the outer peripheral edge portion with an annular groove in communication with a resin injection channel, and that b) the valve seal is partially fitted in the annular groove and adapted for pressing contact with the valve seat and anchored in the annular groove by a resin injected into the groove through the resin injection channel at a predetermined pressure.

According to the construction described above, the valve seal is adapted for pressing contact with the valve seat by the resin which is cured after having been injected into the annular groove through the resin injection channel at the site. Consequently, the seal pressure between the valve seat and the valve seal can be set to a predetermined constant value over the entire circumference of the valve disk without excessively deforming the valve seal and regardless of the dimensional errors of the valve seat, stem, disk and seal and of the errors involved in installing these components.

Various features and advantages of the present invention will be readily understood from the embodiment to be described below in detail with reference to the accompanying drawings, in which.

Figure 1:
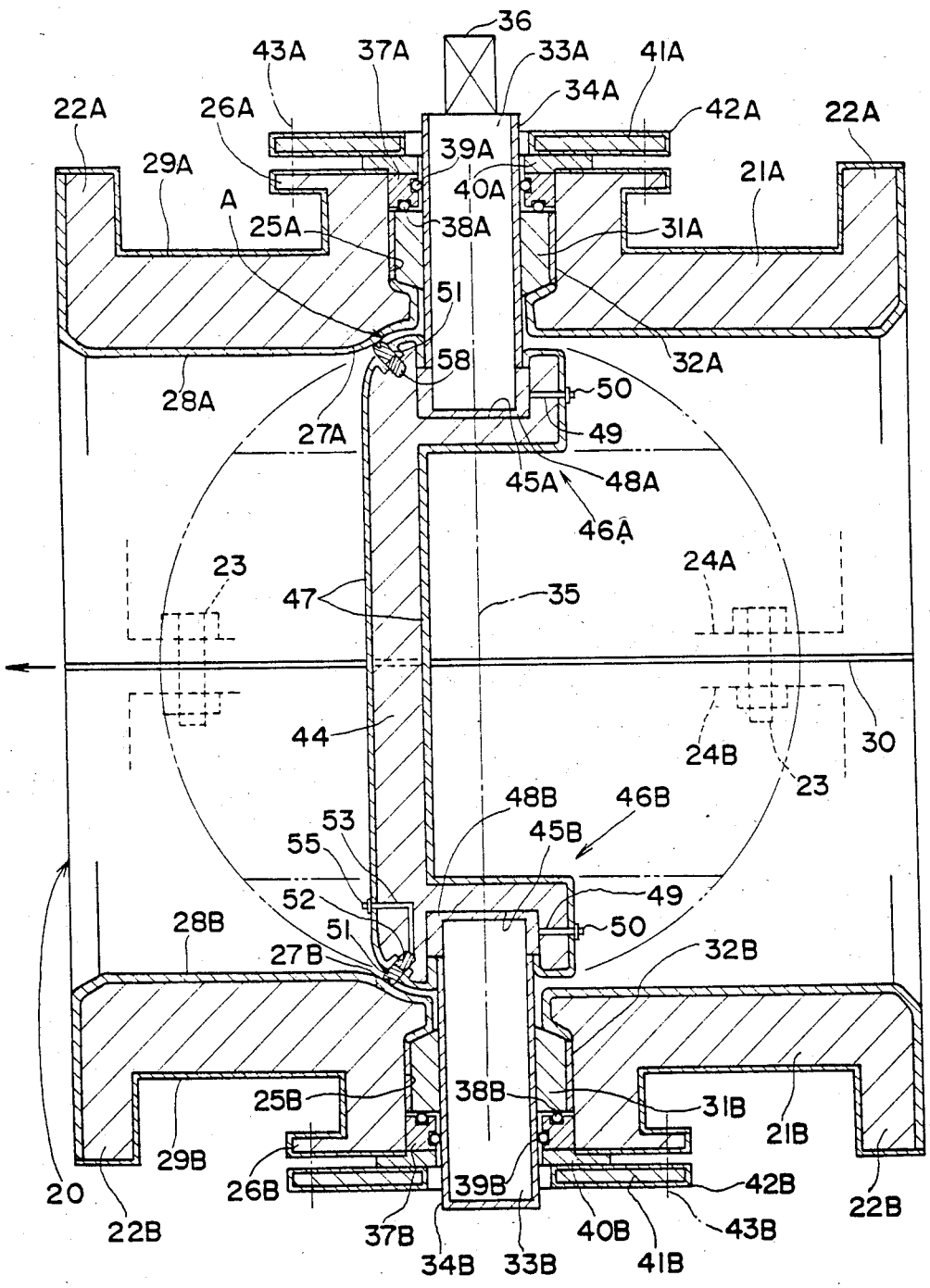
FIG. 1 is a view in longitudinal section showing a butterfly valve embodying the present invention.
Figure 2:
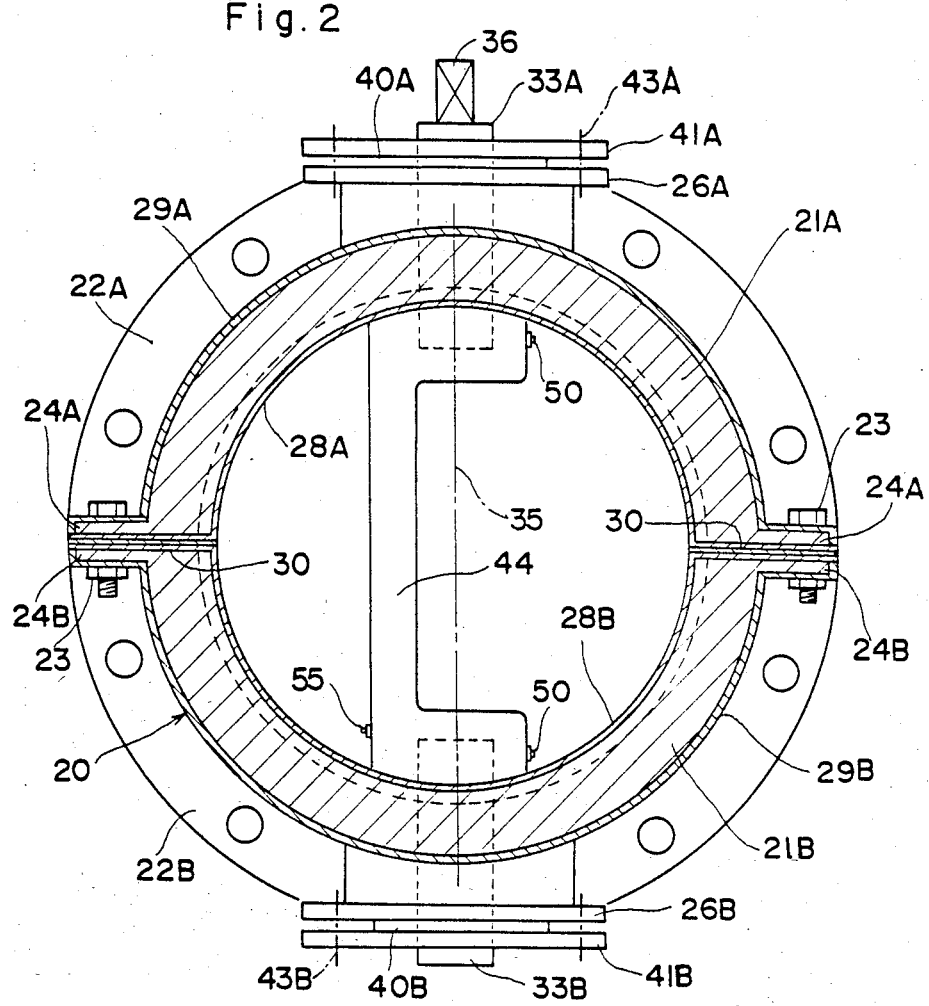
FIG. 2 is a view in transverse section showing the butterfly valve.

With reference to FIGS. 1 and 2, a substantially tubular casing 20 comprises a first semicylinder 21A and a second semicylinder 21B. The semicylinder 21A (21B) is formed at its axially opposite ends with arcuate flanges 22A (22B) for connection to pipes and has at its circumferentially opposite ends axial flanges 24A (24B) for joining the semicylinder 21A (21B) to the other semicylinder 21B (21A) by fasteners 23 such as bolts and nuts. The semicylinder 21A (21B) is formed approximately at its circumferentially and axially central portion with a stem bore 25A (25B) extending at right angles with the axis of the casing. At the outer end of the stem bore 25A (25B), the semicylinder is integrally formed with an annular rim 26A (26B). Each stem bore has an inner small-diameter portion and an outer large-diameter portion. The bearing means, etc. to be described later are fitted in the large diameter portion. The interior flow channel defined by the casing 20 has a diametrically small upstream portion and a diametrically large downstream portion, with the result that stepped portions 27A, 27B are formed at a location slightly upstream from the inner openings of the stem bores 25A, 25B. The semicylinders 21A, 21B are made of iron and symmetrical and are therefore inexpensive to make and interchangeable.

A resin lining 28A (28B) is formed by lamination over the inner surface of the semicylinder 21A (21B). The resin lining 28A (28B) extends over the seal faces of the arcuate flanges 22A (22B) at the axially opposite ends of the semicylinder and also extends into the stem bore 25A (25B) to the inner end of the outer large-diameter portion beyond the inner small-diameter portion. A resin lining 29A (29B) is formed over the remaining surface of the semicylinder 21A (21B) except the bored portion 25A (25B).

At the axial flanges 24A, 24B of the semicylinders 21A, 21B, a silicone-containing seal member 30 is provided between the resin linings 28A, 28B.

A resin ring 31A (31B) is inserted in the outer large-diameter portion of the stem bore 25A (25B) and is fixedly positioned therein by pressure-injected resin 32A (32B) upon curing of the resin. The resin 32A (32B) is epoxy resin or polyurethane resin. For example when epoxy resin is used with nylon used for the resin ring 31A (31B), the resin ring 31A (31B) is easily replaceable since the two resin portions will not adhere to each other.

A metal stem 33A (33B), which is inserted through the resin ring 31A (31B), is coated with a resin lining 34A (34B) over its outer circumferential surface except at the inner end portion thereof. An annular seal 37A (37B) is fitted in the large-diameter portion of the stem bore 25A (25B) around the valve stem 33A (33B). The seal 37A (37B) is provided with a first O-ring 38A (38B) in contact with the resin ring 31A and a second O-ring 39A (39B) in contact with the resin lining 34A (34B) on the valve stem 33A (33B). An annular rubber seal plate 40A (40B) is provided on the outer side of the annular seal 37A (37B). Further provided on the outer side of the seal plate 40A (40B) is an annular holding plate 41A (41B) made of metal and entirely coated with a resin lining 42A (42B). When the holding plate 41A (41B) is fixed to the annular rim 26A (26B) by fasteners 43A (43B), the rubber seal plate 40A (40B) is deformed and held in contact with the resin lining 34A (34B) on the valve stem 33A (33B).

One of the valve stems, i.e. the stem 33A, is integral with a connecting head 36 at its outer end for connection to a rotatable operating member (not shown), while the outer end of the other valve stem 33B is covered with the resin lining 34B.

Within the interior of the casing 20, there is disposed a metal valve disk 44 which is integrally formed on one side thereof with a pair of diametrically spaced stem mount portions 46A, 46B. Each stem mount portion 46A (46B) has a circular cavity 45A (45B) having a larger diameter than the valve stem 33A (33B) for supporting the inner end of the valve stem 33A (33B). The stem end is joined to pressure-injected resin 48A (48B), such as epoxy resin or polyurethane resin, placed in the cavity. The valve disk 44 and both stem mount portions 46A, 46B are coated with a resin lining 47 except where the pressure-injected resin portions 48A, 48B are provided. Indicated at 49 is a resin injection channel, and at 50 a plug.

Figure 3:
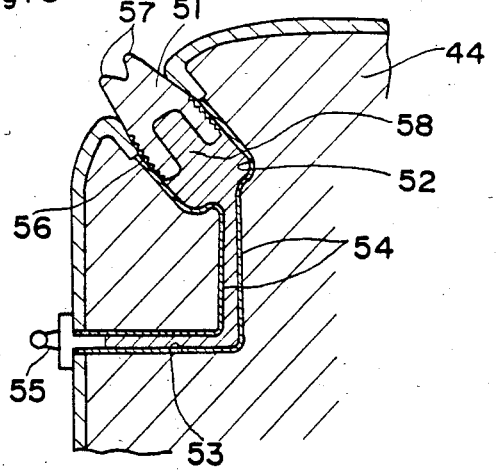
FIG. 3 is an enlarged view in section showing an outer peripheral edge portion of the valve disk of the butterfly valve.

As seen in FIGS. 1 and 3, the valve disk 44 has an outer peripheral edge portion formed with an annular groove 52 into which the resin lining 47 partially extends. Fitted in the annular groove 52 is an annular valve seal 51 made of NBR, CR, silicone or the like having rubber hardness of at least 50. The valve seal 51 has serrated anchor portions 56 for effectively anchoring the seal 51 in the annular groove 52 and seal ridges 57 projecting from the annular groove 52. (Although two seal ridges are shown, one seal ridge may be provided.) The valve seal 51 can be adapted to come into contact with a valve seat A provided by the stepped portions 27A, 27B at a predetermined seal pressure (e.g. usually twice the pressure of fluid through the valve), by pressure-injecting a specified quantity of resin 58, such as epoxy resin or polyurethane, into the groove 52 through a resin injection channel 53. The grooved portion 52 and the channel portion 53 are lined as at 54 with silicon or like release material, whereby the valve seal 51 is made removable along with the injected resin 58 relatively easily for replacement. Indicated at 55 is a plug for closing the resin injection channel 53.

Polyester resin, epoxy resin, acrylic resin or the like is used singly or in combination with a reinforcing fiber for the resin linings 28A, 28B, 29A, 29B, 34A, 34B, 42A, 42B and 47. Different resins may be used for different parts.

The butterfly valve of the above construction is fabricated by the following method.

Figure 4:
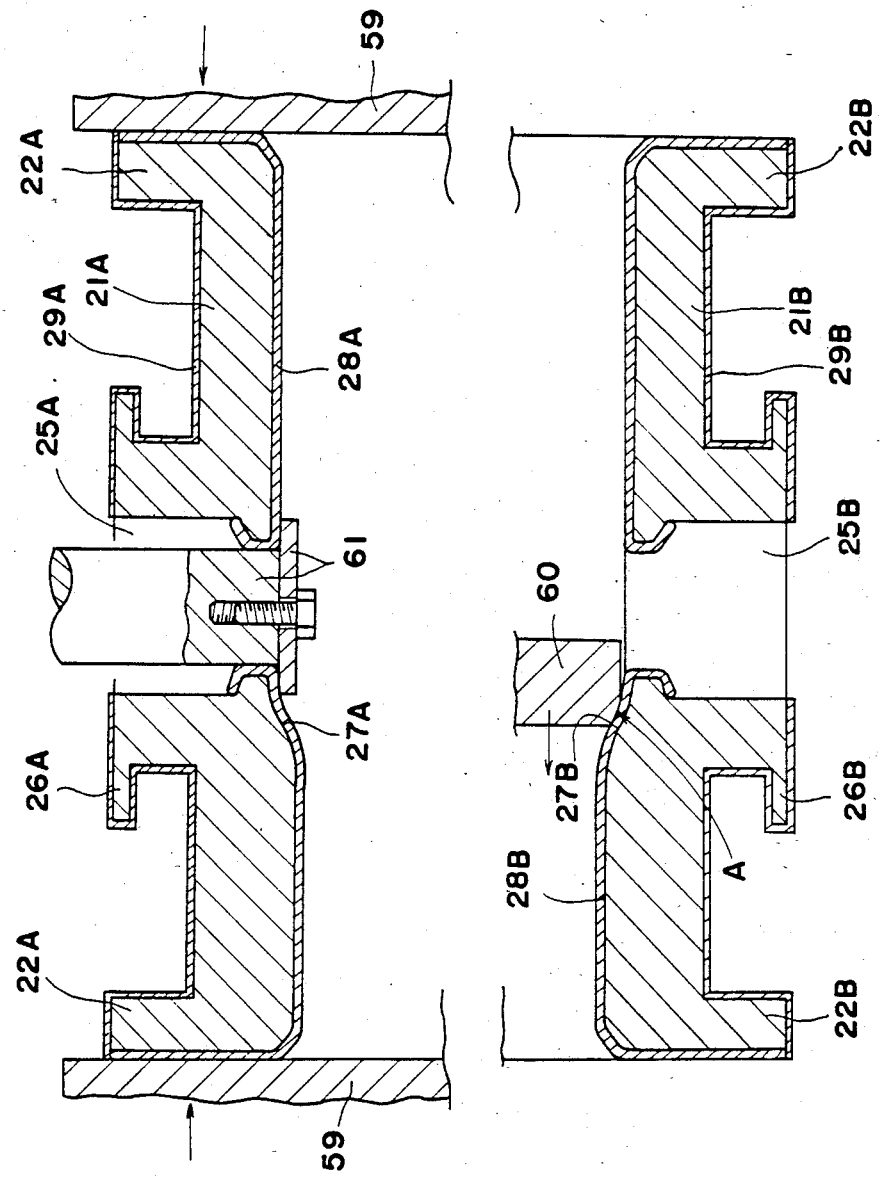
FIGS. 4 to 7 are sectional views showing methods of lining the casing, valve disk, valve stem and holding plate of the butterfly valve.
Figure 5:
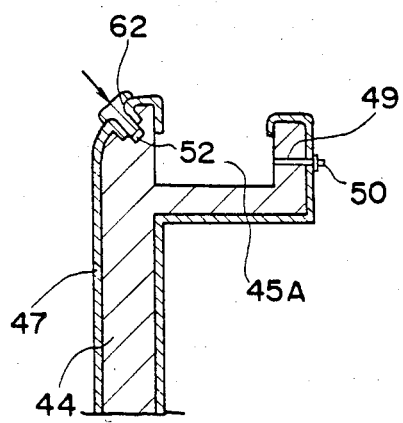
Figure 6:
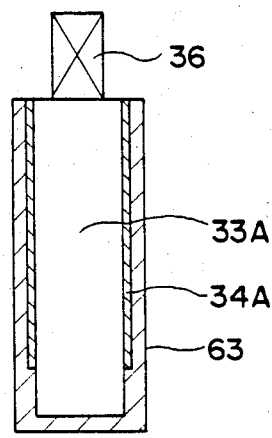
Figure 7:
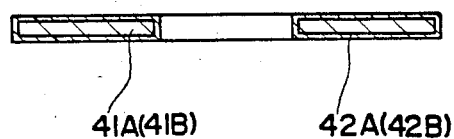

First, each semicylinder 21A (21B), valve disk 44, each valve stem 33A (33B) and each holding plate 41A (41B) are lined with resin individually. When the resin lining 28A (28B) is to be laminatingly formed over the inner surface of the semicylinder 21A (21B), molds 59, 60 and 61 are pressed against only the arcuate flanges 22A (22B), stepped portions 27A (27B) and bored portion 25A (25B) as seen in FIG. 4 while the lining 28A (28B) is still uncured to properly shape these portions with required dimensional accuracy. On the other hand, the outer resin lining 29A (29B) on the semicylinder 21A (21B), which need not be dimensionally accurate, is laminatingly formed without using any mold. The resin lining 47 over the valve disk 44 is formed with use of a mold 62 in the form of an annular plug as shown in FIG. 5 to assure only the interior of the annular groove 52 of the desired dimensional accuracy. A hollow cylindrical mold 63 is used for the resin lining 34A (34B) of the valve stem 33A (33B) as seen in FIG. 6 to give the desired diameter accurately. The resin lining 41A (41B) is laminatingly formed over the holding plate 41A (41B) without using any mold as shown in FIG. 7 since little or no dimensional accuracy is required.

Figure 8:
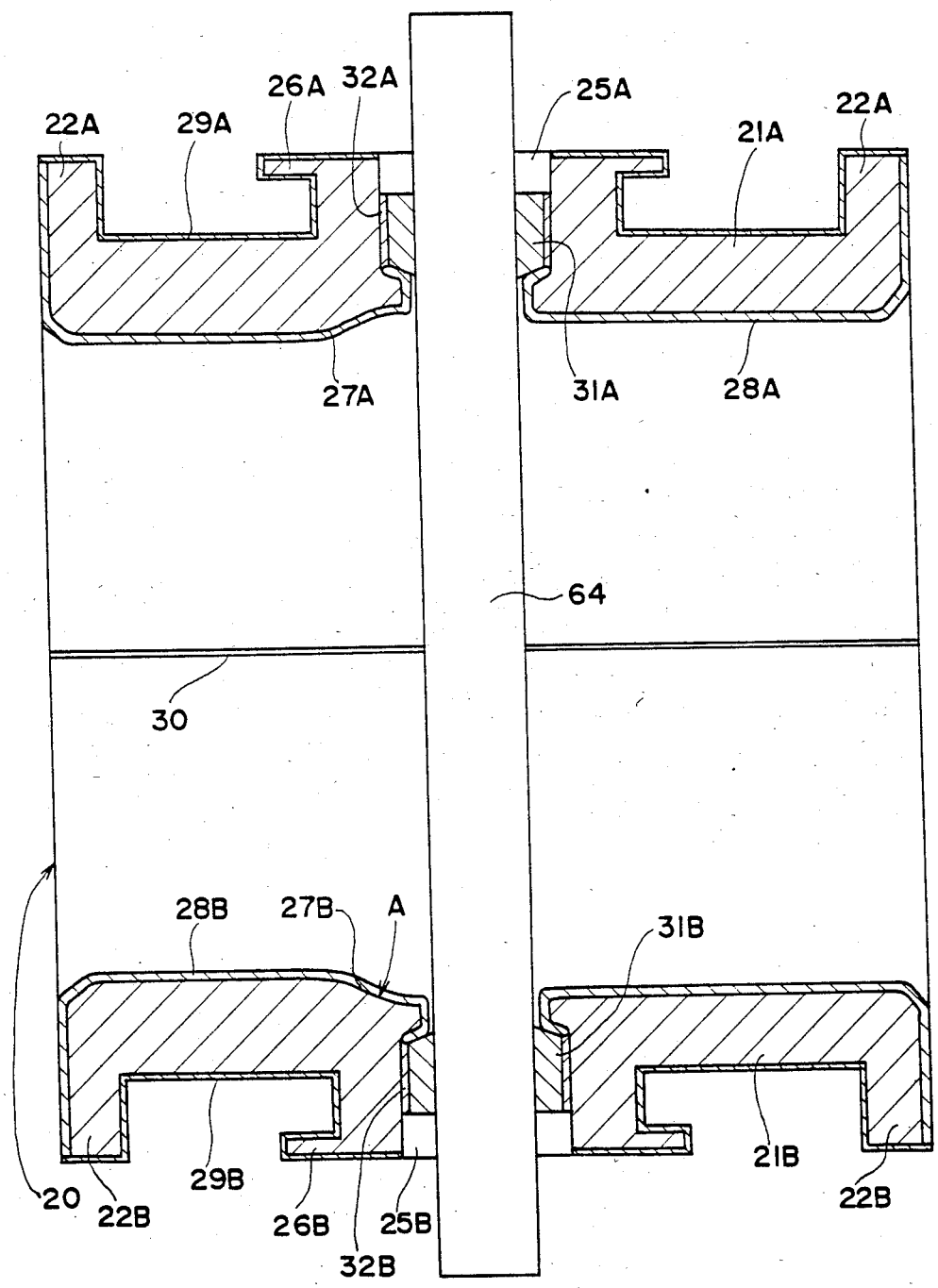
FIGS. 8 and 9 are views in longitudinal section showing steps of assembling the butterfly valve.
Figure 9:
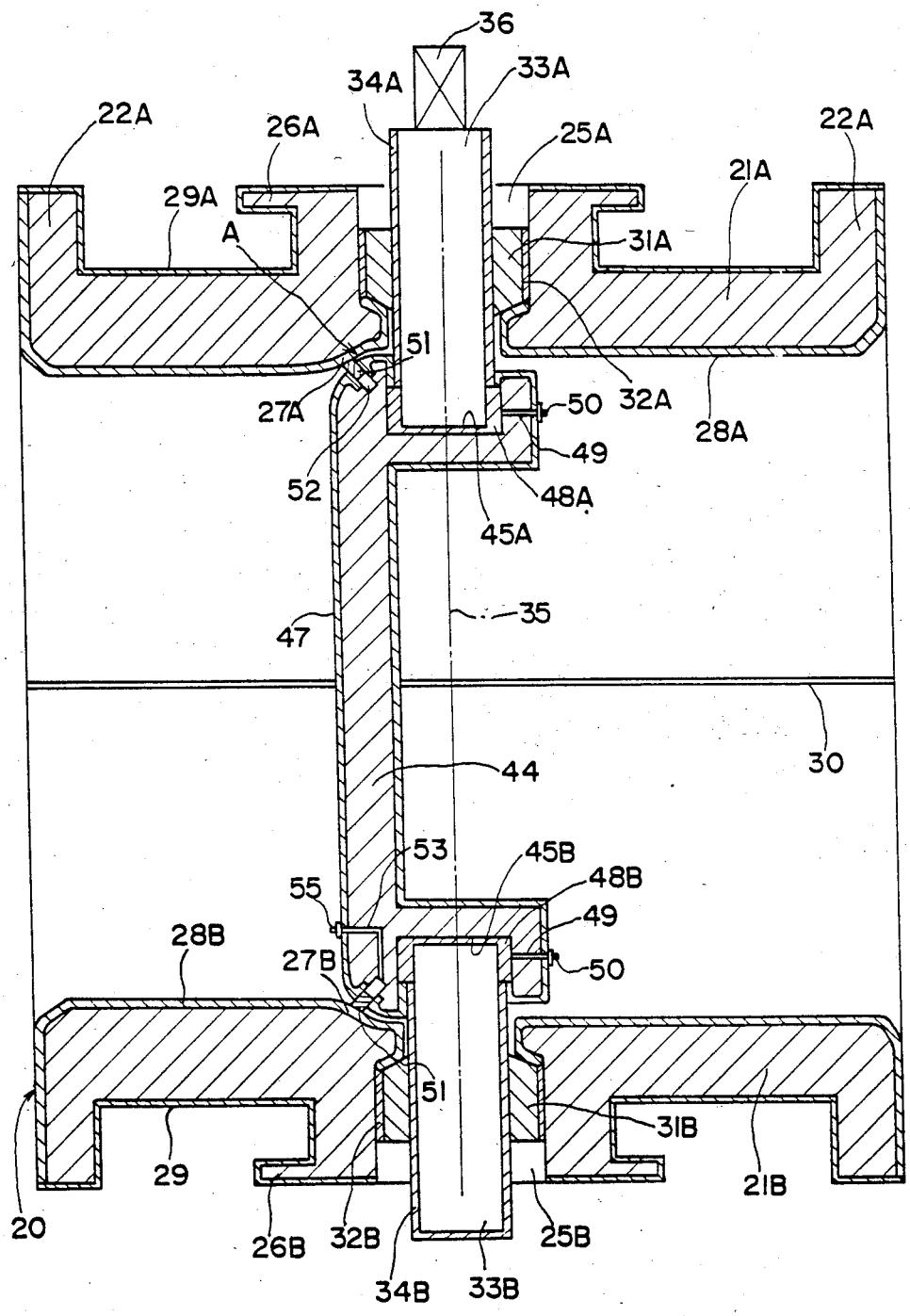

After the parts have been lined, the two semicylinders 21A, 21B are joined together by the fasteners 23 with the seal member 30 provided therebetween. As seen in FIG. 8, a dummy stem 64 is then inserted through the stem bores 25A, 25B. The dummy stem 64 is made equal in outside diameter to the valve stem 33A (33B) inclusive of the thickness of the resin lining 34A (34B). Each resin ring 31A (31B) is fitted around the inserted dummy stem 64 and placed into the large-diameter portion of the corresponding stem bore 25A (25B). With the dummy stem 64 adjusted to a predetermined fixed position relative to the casing 20, resin 32A (32B) is pressure-injected into the space around the resin ring 31A (31B) and cured, whereby the resin ring 31A (31B) can be fixedly positioned within the stem bore 25A (25B). In this way, the resin ring 31A (31B) can be placed in position accurately even if the stem bore 25A (25B) is not formed accurately.

Next, the dummy stem 64 is removed, and the valve disk 44 is inserted into the casing 20, with the valve seal 51 fitted in the annular groove 52 of the disk 44. With the valve disk 44 so positioned within the casing 20 that each circular cavity 45A (45B) is opposed to the corresponding stem bore 25A (25B), the valve stem 33A (33B) is inserted into the resin ring 31A (31B) from outside to loosely fit the stem inner end into the circular cavity 45A (45B). With the valve disk 44 adjusted to the proper position relative to the valve seat A, resin 48A (48B) is pressure-injected into the circular cavity 45A (45B) through the injection channel 49 and cured to fix the valve stem 33A (33B) to the valve disk 44, whereby the valve stem 33A (33B) can be attached to the valve disk 44 with high precision even if the circular cavity 45A (45B) is not formed accurately.

Subsequently, resin 58 is pressure-injected into the annular groove 52 through the injection channel 53 until a predetermined seal pressure is obtained, whereupon the injection is discontinued, and the resin 58 is cured in this state to fix the valve seal 51 to the valve disk 44. Thus, the position of the valve seal 51 can be adjusted at the site without the necessity of accurately forming the annular groove 52.

Next, the seal 37A (37B), the rubber seal plate 40A (40B) and the holding plate 41A (41B) are fitted around the valve stem 33A (33B) from outside in this order, and the holding plate 41A (41B) is fastened to the annular rim 26A (26B) by the fasteners 43A (43B).

The butterfly valve thus assembled is installed in a specified portion of a pipeline for operation.

During operation, the valve disk 44 is rotated about an axis 35 by the connecting head 36 for opening or closing to control the flow through the pipeline. When the valve disk 44 is opened to the greatest extent, the space between the two stem mount portions 46A, 46B also serves as a flow channel to achieve an increased maximum flow rate. The fluid which acts to leak through the stem bores 25A, 25B during operation is prevented from flowing out by a double seal structure, i.e. the seal 37A (37B) and the rubber seal plate 40A, 40B. The seal 37A (37B) and the rubber seal plate 40A (40B) can be replaced by loosening the fasteners 43A (43B) and removing the holding plate 41A (41B). Because the valve stem 33A (33B) is supported by the fixedly positioned resin ring 31A (31B), the replacement can be accomplished also during operation. While out of operation, the valve can be repaired or inspected by removing the holding plate 41A (41B), etc. and also the fasteners 23 and then removing the semicylinder 21A (21B) from the valve stem 33A (33B). Thus, although the valve stems 33A, 33B and the valve disk 44 is in the form of an assembly, the valve can be checked or repaired easily for maintenance.

Although the valve disk 44 is mounted on the casing 20 by the pair of valve stems 33A, 33B according to the illustrated embodiment, an annular stem mount portion may be provided on one side of the valve disk 44 approximately at its center for loosely inserting a single valve stem therethrough, such that the valve stem is fixed to the mount portion by pressure-injected resin. Instead of providing the valve seat A by the stepped portions 27A, 27B, an annular portion having a rounded crest may be provided on the inner surface of a casing having a specified inside diameter to serve as a valve seat. In this case, the annular valve seal provided at the outer peripheral edge portion of the valve disk is adjusted in exact radial direction by pressure-injecting resin into the annular groove having the valve seal fitted therein to contact the rounded crest at a predetermined seal pressure.

The valve stem 33A (33B) may be made of reinforced resin instead of metal. Further the semicylinder 21A (21B) and the valve disk 44 may be made of resin concrete instead of metal. In this case, the resin concrete is composed of the following ingredients, for example.

Siliceous sand: 100 parts by weight
Calcium carbonate: 5 parts by weight
Polyester resin: 20 parts by weight
Glass fiber, 8 to 12 mm in length: 5-10 parts by weight The siliceous sand (100 parts by weight) is composed of:
No. 3: 60 parts by weight
No. 5: 30 parts by weight
No. 8: 10 parts by weight Of these ingredients, siliceous sand, calcium carbonate and polyester resin afford high mechanical strength and high resistance to compression, while glass fiber gives tensile strength.

We claim:

1. A method of fabricating a butterfly valve comprising a substantially cylindrical casing (20) having an inner circumferential surface formed with an annular valve seat (A), a pair of stem bores (25A, 25B) formed through said casing (20) at diametrically opposite locations thereof, valve stem means (33A, 33B) rotatably extending through said pair of stem bores (25A, 25B), a valve disk (44), stem mount means (46A, 46B) on said valve disk (44) attaching said valve disk (44) to the valve stem means (33A, 33B), the valve disk (44) having an outer peripheral edge portion opposed in its entirety to the valve seat (A) when the valve disk (44) is in its closed position, an annular groove (52) in the outer peripheral portion of said valve disk (44), and an annular valve seal (51) partially fitted in said annual groove (52), a resin injection channel (53) with which the annular groove (52) is in communication, said valve seal (51) being radially deformed and anchored in the annular groove (52) by first resin (58) injected into the groove (52) through the resin injection channel (53) at a predetermined pressure so that the valve seal (51) is pressed uniformly against the valve seat (A) when the valve disk (44) is in its closed position, wherein the method is characterized in that, (a) prior to introducing the valve disk (44) into the casing (20) and inserting the valve stem means (33A, 33B) through the stem bores (25A, 25B) of the casing (20), a dummy stem (64) having a diameter equal to the diameter of the valve stem means (33A, 33B) is inserted through the stem bores (25A, 25B),
(b) a bearing ring (31A, 31B) is fitted on the dummy stem (64) and placed in each stem bore (25A, 25B),
(c) the dummy stem (64) is adjusted to a predetermined position relative to the casing (20) with a clearance formed between the bearing ring (31A, 31B) and the stem bore (25A, 25B),
(d) the clearance is filled with second resin (32A, 32B) injected under pressure so that the bearing ring (31A, 31B) is anchored in place upon curing of the second resin (32A, 32B),
(e) the dummy stem (64) is removed from the anchored bearing ring (31A, 31B),
(f) the valve disk (44) is introduced into the casing (20),
(g) the valve stem means (33A, 33B) is inserted through the anchored bearing ring (31A, 31B) so as to be received by the stem mount means (46A, 46B) of the valve disk (44),
(h) the valve disk (44) is adjusted to a predetermined position relative to the valve seat (A) with a second clearance formed between the valve stem means (31A, 31B) and the stem mount means, and
(i) the second clearance is filled with third resin (48A, 48B) injected under pressure so that the valve stem means (31A, 31B) is anchored onto the stem mount means (46A, 46B) upon curing of the third resin (48A, 48B).

2. A method as defined in claim 1 wherein the inner surface of the valve disk (44) defining the annular groove (52) and the resin injection channel (53) are provided with a lining (54) of material which is capable of readily releasing the first resin (58) from the annular groove (52) and the resin injection channel (53).

3. A method as defined in claim 1 wherein the portion of the valve seal (51) fitted in the annular groove (52) has a serrated anchor portion (56).

4. A method as defined in claim 1 wherein the valve disk (44) is covered with a resin lining (47) substantially over the entire surface thereof, and the resin lining (47)

partially extends into the annular groove (52) and is shaped by an annular plug-like mold (62) to a specified form and specified dimensions within the annular groove (52).

5. A method as defined in claim 1 wherein an annular seal (37A, 37B) is provided within each of the stem bores (25A, 25B) outwardly of a corresponding bearing ring (31A, 31B).

6. A method as defined in claim 1 wherein the casing (20) is provided with a resin lining (28A, 28B) over the inner circumferential surface thereof, and the resin lining (28A, 28B) extends partially into the stem bores (25A, 25B).

7. A method as defined in claim 1 wherein the casing (20) is provided with a resin lining (28A, 28B) over the inner circumferential surface thereof, and the resin lining (28A, 28B) extends over both end faces of the casing (20).

8. A method as defined in claim 1 wherein the valve stem means (33A, 33B) is formed with a resin lining (34A, 34B) over the circumferential surface thereof except where the stem means is fixed to the stem mount means (46A, 46B).

9. A method as defined in claim 1 wherein the casing (20), the valve stem means (33A, 33B) and the valve disk (44) are made of metal.

10. A method as defined in claim 1 wherein at least one of the casing (20) and the valve stem means is made of resin concrete.

11. A method as defined in claim 1 wherein the valve stem means (33A, 33B) is made of reinforced resin.

12. A method as defined in claim 1 wherein the casing (20) comprises semicylinders joined together by fastening means (23).

13. A method as defined in claim 1 wherein the valve stem means comprises a pair of valve stems (33A, 33B), and the stem mount means comprises a pair of stem mount portions (46A, 46B) formed on one side surface of the valve disk (44) as diametrically spaced apart from each other.

14. A method as defined in claim 13 wherein each of the stem mount portions (46A, 46B) has a circular cavity (45A, 45B) having a larger diameter than a corresponding valve stem (33A, 33B), and the inner end of the valve stem (33A, 33B) is fixed in the circular cavity (45A, 45B) by the third resin (48A, 48B) pressure-injected into the cavity through a resin injection channel (49) communicating with the circular cavity (45A, 45B).

* * * * *